Patented Aug. 17, 1948

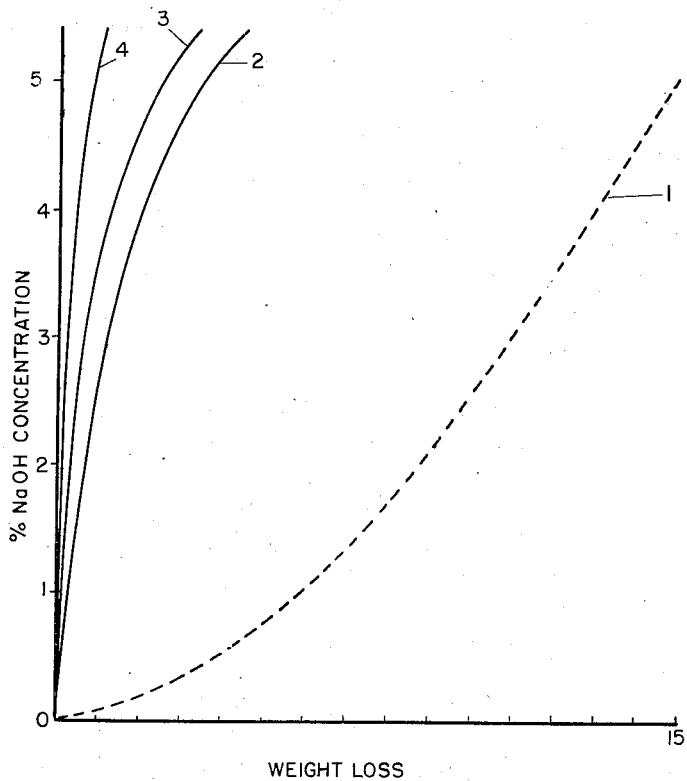

2,447,297

UNITED STATES PATENT OFFICE 2,447,297

PROTECTION OF GLASS SURFACES AGAINST ALKALI ATTACK

Walter F. Wegst and Leslie R. Bacon, Wyandotte, and Thomas H. Vaughn, Grosse Ile, Mich., assignors, by mesne assignments, to Wyandotte Chemicals Corporation, Wyandotte, Mich., a corporation of Michigan Application January 6, 1942, Serial No. 425,804

5 Claims. (Cl. 252—135)

The present invention relates to a process and detergent composition for the protection of glass or glazed surfaces, such as those of milk or beverage bottles and similar glass containers and of affixed ceramic glazed labels, during the washing thereof. While described with particular reference to the cleansing of bottles and the like as aforesaid, protective action is similarly available in general in the cleansing by alkaline detergents of glazed or vitreous ceramic surfaces, such as those of mixing kettles, holding vessels, pasteurizers, etc., widely used in the food industries, where the efficient germicidal and cleansing action of strong alkalis would be desirable but for their corrosive action.

It is the common practice in the bottling of dairy products and a variety of beverages to refill and re-use the glass bottles many times over, during their normal life. When such bottles are returned to the bottler after being emptied by the consumer, it is highly important that they be subjected to a vigorous and thorough washing, not only to remove residues, dirt and soil and similar contamination and thus to render them physically clean, but also to subject them to a germicidal action in order to render them sterile and free from bacterial or fungal contamination. Washing solutions of a relatively high alkaline strength have been found most suitable in practice for a washing operation of this nature. Caustic alkali, e. g., sodium hydroxide, is the major ingredient of most such alkali washing solutions. In fact, several State laws require a minimum NaOH content in the bottle washing solutions employed by bottling plant operators.

Other ingredients commonly employed in limited proportions in addition to caustic soda are the carbonates, orthophosphates and silicates of soda. To a more limited extent commercially, pyrophosphates, polyphosphates and borates of soda, and surface active agents, may be similarly employed. Small proportions of neutral salts, of which sodium chloride or sodium sulfate are representative examples, are not uncommonly introduced, either accidentally as impurities or to attain desired objectives. Any impurities of the water supply will of course be present, either in original form or as modified by reaction with constituents of the alkaline solutions, and further in some cases, reagents added separately for softening or special conditioning of the water supply.

It has been found, however, that the glass surfaces of bottles which are subjected to such alkali washing solutions, particularly under conditions of commercial operation where the solution is heated and the bottles handled in a mechanical washing machine, are subject to alkali attack. This attack manifests itself by accentuating the scratched, scuffed, etched or worn appearance of the glass surface, which effect is commonly initiated by mechanical abrasion. "Scuffing" is a term popularly used in the art to describe the pitting, nicking, scratching, wear and general defacement resulting on the glass surfaces through the combined forces of destructive action, such as mechanical abrasion, chemical corrosion, solubility and weathering, to which the glass container is normally subjected. Since largely initiated by mechanical abrasions, the evidences of scuffing are mainly to be found at raised letters, bulges or other contact points, where the effects and appearance may be quite similar to that which might be produced by rough grinding. It has been definitely established that even though scuffing is generally initiated by ordinary physical contact of glass-to-glass or metal-to-glass surfaces, the effects may be increased and encouraged by alkali attack.

Applied color labels are especially subject to abrasion since due to their mode of application they provide a surface slightly raised above the glass background. These labels usually consist of glass frits which are fused in place after formation of the parent article. The effects of abrasion and/or solution of vitreous applied color labels are made particularly evident by loss of luster, dulling, thinning, scratching, peeling, and crocking, or in general the more rapid development of scuffing action. Under severe exposure, labels may soften and crock, resulting in rapid loss of colored pigments and display value. In some instances, these labels are applied as a succession of incomplete coatings of contrasting colors for purposes of working out color designs. The deterioration of such over-lays results in exposure of underlying colors which is particularly unsatisfactory. The protection of applied color labels now commonly employed on glassware for advertising, identification and artistic purposes is a particularly advantageous application of this invention.

Furthermore, scuffing results in a weakening of the strength of glass bottles, rendering them more liable to breakage and even explosion after filling and crowning in the case of pressure retaining vessels such as carbonated beverage bottles. The latter hazard of course is very material from the standpoint of human safety.

In addition, the maintenance of the new and attractive appearance of the glass bottle is of economic importance to the bottling plant operator, since a large portion of his investment is in his stock of bottles. The bottling plant operator therefore finds it highly desirable to keep his bottles free from scuffing, scaling and etching so that they will be not only commercially acceptable to his customers, but also safe for human use and handling.

Realizing that the above mentioned difficulties could not be overcome by the obvious expedient of eliminating the presence of caustic alkali in the washing solution, since the efficiency of the detergent and germicidal action of the latter would also be lost, we have set out in making the present invention, to discover a chemical ingredient which could be used with the alkali washing solution and would not impair its detergent or germicidal activity, while at the same time protecting the glass surfaces against attack and deterioration of the alkali. We have discovered that compounds of zinc, e. g. sodium zincate, zincated alkalis and other compounds which under the conditions of use presumably yield zinc in anionic form by reaction, e. g. zinc chloride, are unusually effective and successful in accomplishing this result.

Furthermore we have unexpectedly found, under commercial bottle washing conditions, particularly effective destruction of microorganisms, apparently a consequence of the use of zincated alkalis.

Evidence has also been secured under commercial operating conditions to the effect that bottles washed with the zincated alkalis of this invention acquire a resistance to mechanical abrasion superior not only to that exhibited by bottles washed with the customary alkalis, but even to new bottles not subjected to such washing treatments. This constitutes a further unforeseen but valuable feature of our invention.

We have found also that solutions of zincated alkalis as hereinafter defined dissolve far lesser amounts of glass substance from bottles than dissolved by solutions of equal concentration selected from the usual bottle washing alkalis and that overall scuffing effects under commercial operating conditions are closely paralleled by the capacity of such solutions to bring glass substance into solution.

It has been found that the protective action imparted by treatment with zincated alkalis against solution of the glass substance continues its restraining action when bottles are subsequently exposed to the solubilizing action of non-zincated alkalis although the effectiveness of this protective action diminishes with increasing exposure.

To the accomplishment of the foregoing and related ends, said invention, then, consists of the means hereinafter fully described and particularly pointed out in the claims.

The annexed drawing and the following description set forth in detail a number of methods and products exemplifying our invention, such disclosed procedures and products constituting, however, but a few examples of various applications of the principle of our invention.

In said annexed drawing there is shown a series of curves illustrating the manner in which the detergent material embodying the principle of our invention protects glass surfaces against alkali attack.

When glass bottles or beverage containers are returned to the bottling plant for washing prior to re-filling, they are ordinarily passed through either soaker type or hydraulic type washing machines. In a large machine of the soaker type a typical cycle of operations would consist in the following:

Prerinse with warm water
Soak at 140° F. in alkaline solution of 3.0–3.5% caustic soda content
Soak at 155° F. in alkaline solution of 2.5–3.0% caustic soda content
Water rinse at lower temperature, as 125° F.
Water rinse at lower temperatures, as 95° F.
Internal and external brushing
One or more internal and external cool water rinses
Internal chlorination rinse In practice the number and sequence of cleansing steps is subject to considerable variation, however, and this is true also of temperatures and concentrations of solutions employed. The step of chlorination is most commonly employed in the washing of dairy bottles.

The practicable ranges of temperature and concentration for the alkaline solutions are usually taken to be 120–165° F. and 1–5% caustic, as hereinafter defined. The effects of soaking time, alkaline concentration and temperature are interrelated in the sense that increased temperatures and/or concentrations diminish the soaking period required to attain a given standard of cleansing and germicidal performance. It is known further that increases in temperature of the alkaline solutions are reflected in increased scuffing action and it is generally true that within the practicable economic limits increased concentrations are reflected in increased corrosion of the glass substance and scuffing action. The period of exposure of bottles to the detergent solutions will usually run upward of 5 minutes per cleansing operation using soaker type machines.

Hydraulic type machines operate on the principle of projecting streams of alkaline solution and rinse waters at high velocity upon the bottles internally and externally rather than passage of bottles through soaker tanks. Due to the vigorous mechanical action the practicable concentrations of and exposures to strongly alkaline solutions may run somewhat lower than for soaker type machines.

In either type machines, the alkali content of the washing solutions is maintained by suitable additions (make-up) from time to time. Control in the field may be exercised through indicating meters or by simplified chemical test methods. One common basis for controlling alkali concentration is the determination of actual caustic soda content, the practicable ranges of which may be taken to be 1–5%, dependent on other conditions hereinbefore referred to.

It has been determined that the alkali attack upon glass bottles during such a washing treatment is in the nature of a dissolution of the glass by the alkali; hence a determination of the weight loss of glass bottles subjected to the action of an alkali washing solution presents a reliable criterion for measuring the degree of such attack.

The present invention particularly consists of the discovery that zincated alkali cleansing compounds, as contrasted with otherwise similar non-zincated compounds, exert a large measure of protective action on glass and vitreous ceramic surfaces against alkali attack and the coincident disadvantages of scuffing, scaling and etching, further, that exposure of ceramic vitreous surfaces to said zincated alkaline solutions enhances the resistance of said surfaces to mechanical scuffing action; and further, that solutions of the zincated alkalis possess enhanced germicidal activity over solutions of non-zincated alkalis otherwise of similar composition.

For the purposes of this specification and the claims appended thereto, we define a zincated alkali compound as an alkaline system containing zinc compounds in such form as to yield zinc in anionic form when brought into aqueous solution. Such anions may be derived from the solution of compounds of the type $Na_2ZnO_2.4H_2O$ (which represents the composition of one recognized hydrated sodium zincate), in water or in alkaline solutions. Under these circumstances ionization leads to the formation of zincate anions or zinc in anionic form:

$$Na_2ZnO_2 \rightarrow 2Na^+ + ZnO_2^{--}$$

Zincate anions may arise also as a consequence of reaction of zinc compounds with caustic soda or other alkaline constituents of the zincated alkali which may yield sodium hydroxide by hydrolysis:

$$2\ NaOH + Zn(OH)_2 \rightarrow Na_2ZnO_2 + H_2O$$
$$2\ NaOH + ZnO \rightarrow Na_2ZnO_2 + H_2O$$
$$4\ NaOH + ZnSO_4 \rightarrow Na_2ZnO_2 + Na_2SO_4 + 2H_2O$$

Accordingly, due to the amphoteric nature of the element zinc, we may employ zinc compounds in which zinc is present initially in anionic, cationic or indeterminate condition, as represented respectively by sodium zincate, zinc sulphate and zinc oxide, for example, the essential requirements being principally that under the conditions of application or use the zinc compounds shall enter into and remain in solution while in contact with the surfaces to be cleansed or sterilized. Preferably such zinc compounds are employed in the amount of 1.5% ZnO content (or chemical equivalent thereto) by weight on the basis of total alkaline materials present. To the end that ready solubility be attained the components of the zincated alkali may be reacted in the dry way or in the presence of limited proportions of moisture, and at elevated temperatures if desired, prior to solution, or solution may be effected by dissolving the constituents by any practicable means.

As examples of how our invention may be performed, we cite the following illustrative examples:

*Example 1*

A stock solution of a zincated alkali was prepared by mixing 143¾ pounds caustic soda with 12½ pounds zinc oxide and adding 218¾ pounds water. After mixing for ten minutes by a high speed mixer the zinc oxide was completely dissolved and the temperatures had risen to about 230° F. Such a stock solution may be diluted directly to the desired concentration for use. Reduced proportions of zinc oxide may be secured by addition of caustic soda before or after dilution, and alkaline salts may be added if desired in limited proportions.

*Example 2*

One hundred ten pounds of a reacted highly zincated alkali comprising 28% ZnO, 44% $Na_2O$ and 28% water were mixed with 660 pounds caustic soda to yield a zincated alkali of 4% ZnO content. This product was used in solution at 2.5–3.0 and 3.0–3.5% caustic soda concentration for extended commercial washing of bottles with excellent results both from anti-scuffing and germicidal view points.

*Example 3*

A stable solution suited to the protective washing of bottles may be prepared by dissolving in the order named, 24 lb. caustic soda, 3 lb. soda ash and 3 lb. of a reacted zincated alkali analyzing 28% ZnO, 44% $Na_2O$ and 28% water in 1000 lb. (120 gallons) water. Commercial hydrated trisodium phosphate, tetrasodium pyrophosphate, sodium metasilicate pentahydrate or other normal constituents of bottle washing solutions as hereinbefore set forth may be substituted for soda ash, singly or in combination.

*Example 4*

Twenty-four pounds of caustic soda are dissolved in ten gallons of water and 3½ pounds hydrated zinc sulfate stirred in and dissolved. This solution may be diluted to 90 gallons for bottle washing use. If preferred, a lesser proportion of caustic soda may be employed and the balance added to the dilution water or to the diluted zincate solution. It is desirable to maintain at all times a considerable excess of caustic soda over zinc sulfate however to avoid the precipitation of zinc hydroxide.

By employing zinc compounds in the manner described in amounts of 4% by weight and above calculated as zinc oxide upon the basis of the total solids present, it has been found that the weight loss or glass dissolving effect of the alkali solution can be practically eliminated and that the bottles, in commercial washing operations may be repeatedly washed a greatly increased number of times than heretofore, without displaying the detrimental effects of scuffing, scaling or etching. On the other hand notably small proportions of zinc compounds give marked evidence of protective action.

By way of illustrative example, new glass bottles weighing approximately 393±3 grams were exposed to the action of alkali bottle washing solutions for a period of six days and at a temperature of 185±5° F.; the degree of alkali attack by a straight caustic soda solution on the one hand, and by a zincated caustic soda solution on the other hand, upon these bottles, as determined by the loss in weight of the individual bottles, is shown in the following table:

| Composition of Solution | Per Cent ZnO, by Weight (On Total Alkali Basis) | Weight Loss After Alkali Exposure, Brushing and Drying |
|---|---|---|
| Caustic Soda (NaOH): | | Mg. |
| 1% by Weight | 0 | 749 |
| 3% by Weight | 0 | 1,180 |
| 5% by Weight | 0 | 1,471 |
| Caustic: Zincate Ratio θ ($NaOH:Na_2ZnO_2.4H_2O$): | | |
| 95:5 at— | | |
| 1% by Weight | 1.9 | 13 |
| 3% by Weight | 1.9 | 151 |
| 5% by Weight | 1.9 | 413 |
| 90:10 at— | | |
| 1% by Weight | 3.8 | 2 |
| 3% by Weight | 3.8 | 36 |
| 5% by Weight | 3.8 | 155 |
| 80:20 at— | | |
| 1% by Weight | 7.6 | 3 |
| 3% by Weight | 7.6 | 9 |
| 5% by Weight | 7.6 | 44 |

θ Zn content calculated to $Na_2ZnO_2.4H_2O$.

In the drawing, the results of the above table are further illustrated by the curves wherein the weight loss is plotted against NaOH content. Thus curve 1 shows how the weight loss increases with increasing concentration in the case of a straight NaOH solution. It will be noted that at the lower concentrations especially, which are most likely to be encountered in normal commercial operation, that curve 1 tends to proceed in the direction of the horizontal ordinate representing weight loss. On the other hand, curves 2, 3 and 4, representing the three compositions of caustic soda and sodium zincate given in order in the above table respectively, all tend to follow the vertical ordinate. In other words, the curves representing the degree of alkali attack upon the glass bottles of the solutions embodying the instant invention display entirely different and greatly improved characteristics over the curve for straight caustic soda alone. Curves for phosphated, carbonated and silicated bottle washing alkalies conform generally with that of caustic soda shown.

Bottles subjected to the above treatment with straight caustic soda had the resultant physical appearance of a heavy white loosely adherent coating or scale and were somewhat etched. In the case of the bottles subjected to the zincated alkali treatment, no etching and no corrosion of the glass surfaces was found. Caustic soda solutions modified by additions respectively of sodium metasilicate, trisodium phosphate, sodium tetraphosphate, sodium carbonate or borax showed effects generally similar to those of caustic soda alone. Thus a suitable composition of material embodying the principle of our invention may contain 1-40% by weight (calculated to the anhydrous content) of the borates, carbonates, orthophosphates, polyphosphates, pyrophosphates and silicates of soda; 1½% by weight or greater on the ZnO basis, or its chemical equivalent, of sodium zincate, zinc sulfate or zinc oxide and the balance caustic soda.

Field tests which we have conducted on the scuffing of bottles under commercial operating conditions show that the relative degree of scuffing observed in the use of different bottle washing alkalies follows closely the same order as weight losses obtained by the foregoing solubility test method. A large number and variety of both commercial and experimental bottle washing alkalies have been so compared. For each product considerable numbers of new bottles have been put through an extended number of complete cycles of washing, filling, closing and emptying without circulation to the trade, followed by immediate return to the washing machine. Machine operations, alkali temperatures and concentrations and all other operating variables were necessarily held closely constant, since wide variance in scuffing action is known to result otherwise.

An experiment which further illustrates the advantages of this invention was carried out as follows: New unwashed bottles were subjected to the regular operations of syruping, charging with carbonated water, capping and upsetting on commercial equipment in course of commercial production operations. At the completion of each cycle the contents were dumped and bottles returned to execute a large and standard number of cycles. These bottles were then compared with and found indistinguishable from another group of new, unwashed bottles which were subjected to not only the same above handling but in addition the usual operations of mechanical charging to the bottle washer and standard soaker machine washing using a zincated alkali containing 4% ZnO. The two sets of bottles were found indistinguishable and but mildly scuffed. Since mechanical loading of the washer, mechanical handling and movement in course of washing, and the alkaline solution itself inevitably take some toll in terms of scuffing action, the scuffing action observed in the first instance has been reduced to an approximately equivalent degree. Or otherwise stated, a measure of protective action against mechanical injury, in addition to protection against alkali attack, has been imparted by the zincated washing treatment.

In the course of commercial testing of zincated alkalis, remarkably low bacterial counts on bottles as delivered from the washing machine have been found. For example by a total of three bottles taken at random and plated directly in the bottle, counts of 0, 1 and 1 colony were obtained by an independent bacteriologist having no knowledge of the instant use of zincated alkali. A count of less than 50 colonies per bottle of this class may be accepted as excellent according to present standards and counts up to 400 might be considered passable although unsatisfactory.

While we are at present unable to ascribe any precise scientific theory or principle to the phenomena of our invention of germicidal effectiveness, reduced abrasion of surface, and reduced solubility of glass substance, it is possible that all are manifestations of the presence of a surface film formed intimately at the surface of the glass, resulting in an effective reduction in solubility of glass substance through interposition of an effective barrier between underglass and corrosive solution. This barrier may possess increased hardness capable of more effectively resisting mechanical action, yet structurally be capable of yielding zinc in germicidally effective form. Such a layer would be probably only a few molecules in thickness and in fact may be integral with the glass surface through ion exchange, surface reaction or diffusion. On the other hand a gelatinous protective barrier may be interposed, exerting its protective action against mechanical abrasion while wet through lubricating action, and its insolubilizing action through interposition of a diffusion barrier.

Other modes of applying the principle of our invention may be employed instead of the one explained, change being made as regards the product and method herein disclosed, provided the step or steps stated by any of the following claims or the equivalent of such stated step or steps be employed.

We therefore particularly point out and distinctly claim as our invention:

1. A composition for cleaning glass and vitreous ceramic surfaces consisting of 1% to 40% by weight of materials selected from the group consisting of sodium carbonate, trisodium phosphate, tetrasodium pyrophosphate and sodium metasilicate calculated to the anhydrous basis, an alkali-soluble zinc compound giving zinc in anionic form by reaction in alkaline solution present in a ZnO equivalent amount of 1.5% to 7.6% by weight on the basis of the total alkali compounds present, and the balance caustic soda.

2. A composition for cleaning glass and vitreous ceramic surfaces consisting of 1% to 40% by weight of materials selected from the group consisting of sodium carbonate, trisodium phosphate, tetrasodium pyrophosphate and sodium metasilicate calculated to the anhydrous basis, together with 5% to 20% by weight of $$Na_2ZnO_2.4H_2O$$

and the balance caustic soda.

3. A glass cleaning composition comprising essentially caustic soda, a small proportion of tetrasodium pyrophosphate, and a small amount of a substantially caustic soda-soluble zinc compound, the amount of zinc compound being sufficient upon reaction with the caustic soda to produce up to 20% sodium zincate based upon the quantity of caustic soda remaining after the reaction.

4. A method of cleaning glass bottles which comprises washing the bottles in a solution consisting essentially of water and uncombined caustic soda, said solution having a caustic soda content of approximately 1-5% by weight and a small proportion of a caustic soda-soluble zinc compound, the amount of zinc compound being sufficient upon reaction with the caustic soda to produce up to 7.6% by weight in terms of ZnO equivalent of reaction product, based upon the quantity of caustic soda remaining after the reaction.

5. A method of cleaning glass bottles which comprises washing the bottles in a solution consisting essentially of water and uncombined caustic soda, said solution having a caustic soda content of approximately 3% by weight and a small proportion of a caustic soda-soluble zinc compound, the amount of zinc compound being sufficient upon reaction with the caustic soda to produce up to 7.6% by weight in terms of ZnO equivalent of reaction product, based upon the quantity of caustic soda remaining after the reaction.

WALTER F. WEGST.
LESLIE R. BACON.
THOMAS H. VAUGHN.

REFERENCES CITED

The following references are of record in the file of this patent:

UNITED STATES PATENTS

| Number | Name | Date |
|---|---|---|
| 546,206 | Wachter | Sept. 10, 1895 |
| 674,593 | Bartelt | May 21, 1901 |
| 1,267,737 | Bartelt | May 28, 1918 |
| 2,035,652 | Hall | Mar. 31, 1936 |
| 2,085,966 | Foster et al. | July 6, 1937 |
| 2,087,264 | Poisner | July 20, 1937 |
| 2,155,045 | Griffith et al. | Apr. 18, 1939 |
| 2,241,984 | Cooper | May 13, 1941 |
| 2,289,578 | Hull et al. | July 14, 1942 |

OTHER REFERENCES

Soap, December 1936, page 69.
Chemical Formulary, Bennett, vol. 4 (1939), page 507.